L. BABOS.
HOSE COUPLING.
APPLICATION FILED MAR. 3, 1915.
1,151,851.
Patented Aug. 31, 1915.
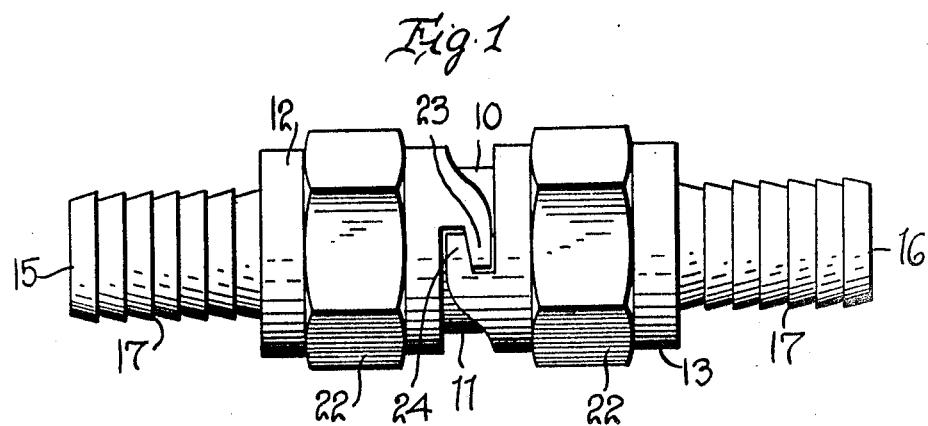
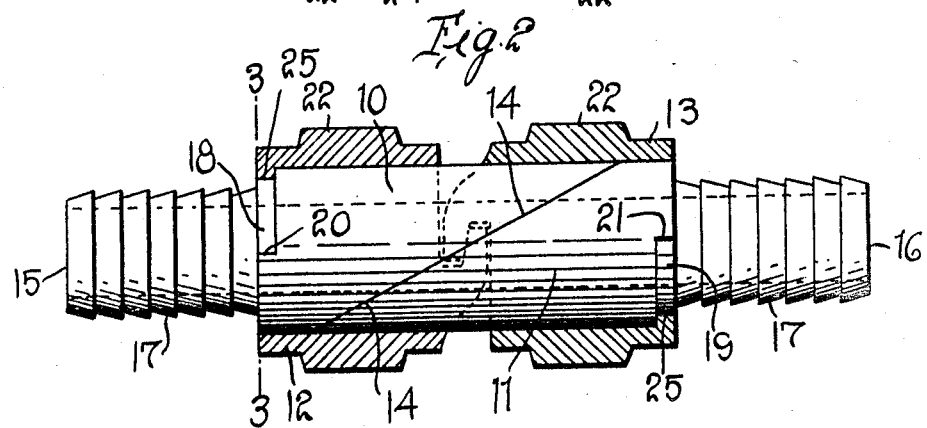
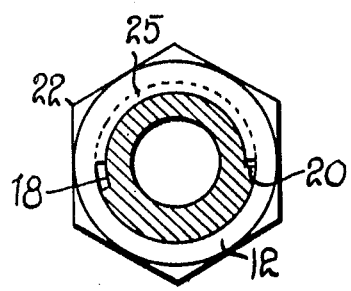
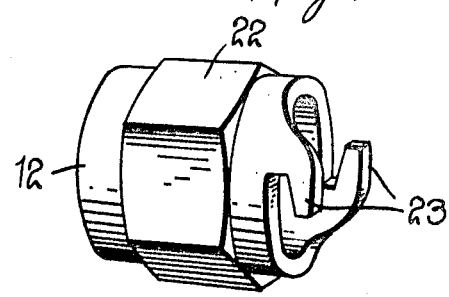
Witnesses
Robert M. Sutphen
A. L. Hind
Inventor
L. BABOS
By Watson E. Coleman
Attorney
COLUMBIA PLANOGRAPH CO., WASHINGTON, D. C.

UNITED STATES PATENT OFFICE.

LACEY BABOS, OF WINSLOW, WASHINGTON.

HOSE-COUPLING.

1,151,851.

Specification of Letters Patent. Patented Aug. 31, 1915.

Application filed March 3, 1915. Serial No. 11,815.

*To all whom it may concern:*

Be it known that I, LACEY BABOS, a Hungarian, residing at Winslow, in the county of Kitsap and State of Washington, have invented certain new and useful Improvements in Hose-Couplings, of which the following is a specification, reference being had to the accompanying drawings.

My present invention relates to new and useful improvements in hose couplings and its principal object aims to provide a device of this character which may be cheaply manufactured and will be durable and efficient in service.

A more specific object of my invention is to provide a hose coupling which consists essentially in two mating coupling elements and a pair of locking sleeves which are rotatable on the coupling elements and engageable with each other for drawing the meeting faces of the coupling elements into sealing engagement with each other.

The above and other incidental objects of a similar nature which will be hereinafter more specifically treated, are accomplished by such means as illustrated in the accompanying drawings, described in the following specification and then more particularly pointed out in the claim which is appended hereto and forms a part of this application.

With reference to the drawings, wherein there has been illustrated the preferred embodiment of the invention, as it is reduced to practice, and throughout the several views in which similar reference numerals designate corresponding parts, Figure 1 is a view in elevation, showing the coupling closed; Fig. 2 is a longitudinal section taken medially through the coupling, the nipple being shown in elevation. Fig. 3 is a section on the line 3—3, of Fig. 2; and Fig. 4 is a detail perspective view of one of the coupling sleeves.

As illustrated in the accompanying drawings, my improved hose coupling includes as its essential elements, a pair of tubular coupling members 10 and 11 and a pair of co-acting sleeve members 12 and 13 which are engageable with each other in a manner to be hereinafter more fully described, for either drawing the members 10 and 11 into sealing engagement with each other or for releasing them.

The members 10 and 11 are substantially similar in construction, each being formed from a metal tube, one end of which is truncated, providing a diagonally extending edge 14, in each instance. These edges 14 of the members 10 and 11 are designed to engage against each other when the coupling is closed. From the outer end of each of the members 10 and 11, there extends a nipple, as indicated at 15 and 16. These members 15 and 16 are of less diameter than the members 10 and 11 and are co-axially disposed with respect thereto. Annular ribs or corrugations 17 are formed on the members 15 and 16 for the obvious purpose of holding the hose lengths against accidental removal from the coupling elements.

The outer ends of the members 10 and 11 are provided with the segmental grooves 18 and 19. The formation of the grooves 18 and 19 results in the provision of the stop shoulders 20 and 21 which are engageable with the inwardly extending segmental flanges on the sleeves 12 and 13 for limiting the rotation of the sleeves as will be hereinafter more fully described.

The sleeve members 12 and 13 are of such diameter that they snugly engage over the members 10 and 11, as best shown in Fig. 2. Each sleeve is provided with a centrally located enlargement 22 of polygonal form so that a wrench or equivalent tool may be conveniently employed in closing or opening the coupling. The adjacent terminals of the sleeves 12 and 13 are provided with the pairs of lugs 23 and 24 respectively. The lugs 23 of the sleeve 12 are oppositely directed with respect to each other as are the lugs 24 of the sleeve 13. The inner edges of the lugs 23 and 24 are spaced from the adjacent terminal edges of the sleeves a distance substantially equal to the width of each lug. These inner edges of the lugs are also inclined in such manner that when the mating lugs 23 and 24 of the two sleeves are moved oppositely with respect to each other, the sleeves will be drawn toward each other with a resultant urging of the edges 13 and 14 of the members 10 and 11 into sealing engagement with each other.

It is now to be noted that a segmental flange 25 extends inwardly from the outer terminal of each of the members 12 and 13 and that these segmental flanges are engageable against the outer terminals of the coupling elements 10 and 11. The engagement of the members 25 with the members 10 and 11 prevents the longitudinal movement of the sleeves over the members 10 and 11 in one direction. The members 25 are of such length that the lugs 20 and 21 may be moved a sufficient distance to permit the disengaging of the lugs 23 and 24 when it is desired to disconnect the coupling. The lugs 20 and 21 serve by engagement with the terminals of the stop flanges 25, to normally hold the edges 14 and the members 10 and 11 in approximate mating relation.

In reduction to practice, it has been found that the form of this invention illustrated in the drawings, and referred to in the above description as the preferred embodiment, is the most efficient and practical; yet realizing that the conditions concurrent with the adoption of this device will necessarily vary, it is desirable to emphasize the fact that various minor changes in details of construction, proportion and arrangement of parts may be resorted to, when required, without sacrificing any of the advantages of this invention, as defined in the appended claim.

What is claimed is:—

A coupling including a pair of mating coupling members, a pair of sleeves rotatable thereon for closing or releasing the coupling members, a segmental shoulder formed on the outer terminal of each of the coupling members, and an inwardly directed stop flange formed on the outer terminal of each sleeve, said shoulders being engageable with the terminals of the flanges for limiting the rotation of the sleeves on the coupling members.

In testimony whereof I hereunto affix my signature in the presence of two witnesses.

LACEY BABOS.

Witnesses:
 JAS. B. LAMB,
 JOHN LECKEY.

Copies of this patent may be obtained for five cents each, by addressing the "Commissioner of Patents, Washington, D. C."